US008266455B2

(12) United States Patent
Kim et al.

(10) Patent No.: US 8,266,455 B2
(45) Date of Patent: Sep. 11, 2012

(54) APPARATUS AND METHOD FOR CONTROLLING POWER OF FIXING UNIT

(75) Inventors: Jin-ha Kim, Seongnam-si (KR); Doo-hyo Moon, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 919 days.

(21) Appl. No.: 11/649,286

(22) Filed: Jan. 4, 2007

(65) Prior Publication Data

US 2007/0226525 A1 Sep. 27, 2007

(30) Foreign Application Priority Data

Mar. 22, 2006 (KR) ........................ 10-2006-0026042

(51) Int. Cl.
*G06F 1/26* (2006.01)
*G03G 15/20* (2006.01)

(52) U.S. Cl. ............................ 713/300; 399/70; 399/88

(58) Field of Classification Search .................. 713/300; 399/69, 70, 88
See application file for complete search history.

(56) References Cited

U.S. PATENT DOCUMENTS 5,359,281 A 10/1994 Barrow et al.
5,986,242 A * 11/1999 Maitani et al. ................ 219/501
6,034,790 A * 3/2000 Kamei et al. .................. 358/475
7,310,485 B2 * 12/2007 Peng et al. ...................... 399/69
2003/0178410 A1 9/2003 Satoh
2006/0024072 A1 * 2/2006 Kuroki et al. .................. 399/33
2006/0051113 A1 3/2006 Kishi et al.

FOREIGN PATENT DOCUMENTS

JP 09197896 7/1997
JP 2002-229375 8/2002
JP 2003-122183 4/2003
JP 2003-280446 10/2003
JP 2004-240250 8/2004
JP 2004-240386 8/2004
JP 2005-091965 7/2005
JP 2005-258346 9/2005

* cited by examiner

*Primary Examiner* — Thuan Du
(74) *Attorney, Agent, or Firm* — Roylance, Abrams, Berdo & Goodman, L.L.P.

(57) ABSTRACT

An apparatus and method for controlling power of a fixing unit is provided. The apparatus includes a power supply unit supplying DC power to the fixing unit, and a power controller controlling the power supply unit to gradually increase a DC power supply time until a pre-set time is reached. Accordingly, a flicker characteristic can be reduced by gradually increasing a supply time of DC power to the fixing unit.

21 Claims, 8 Drawing Sheets

APPARATUS AND METHOD FOR CONTROLLING POWER OF FIXING UNIT

CROSS-REFERENCE TO RELATED PATENT APPLICATION

This application claims the benefit under 35 U.S.C. §119 (a) of Korean Patent Application No. 10-2006-0026042, filed on Mar. 22, 2006, in the Korean Intellectual Property Office, the entire disclosure of which is hereby incorporated by reference.

1. Field of the Invention

The present invention relates to an image forming device such as a printer, a facsimile, or a multi function peripheral (MFP). More particularly, the present invention relates to an apparatus and method for controlling power supplied to a fixing unit included in an image forming device.

2. Description of the Related Art

Printing devices forming a print image using a developer such as toner provide a printed result to users by fixing a developer corresponding to print data input from a host device onto a print medium and discharging the developer-fixed print medium out of the printing device.

Such a printing device can perform a fixing job using a heating roller including a resistor for generating heat. To perform a fixing job in this method, the surface temperature of the heating roller must be maintained at a target fixing temperature, for example, approximately 180° C.

When the printing device receives a print command for the first time after power is turned on or receives a print command in a stand-by mode, the image forming device goes to a print mode. The surface temperature of the heating roller must reach the target fixing temperature quickly to reduce a waiting time from when the print command is received to when a first printed result is discharged.

If more power is supplied to the heating roller included in a fixing unit in order to reduce the waiting time, a resistance of the heating roller decreases, causing an excessive inrush current, thereby increasing a flicker characteristic problem. The flicker characteristic is defined as a phenomenon in which power supplied to adjacent circuits is temporarily weakened.

Accordingly, there is a need for an improved system and method for controlling the power of a fixing unit to reduce a flicker characteristic by gradually increasing a supply time of direct current (DC) power to the fixing unit.

SUMMARY OF THE INVENTION

An aspect of exemplary embodiments of the present invention is to address at least the above problems and/or disadvantages and to provide at least the advantages described below. Accordingly, an aspect of exemplary embodiments of the present invention is to provide an apparatus and method for controlling power of a fixing unit to reduce a flicker characteristic by gradually increasing a supply time of direct current (DC) power to the fixing unit.

According to an aspect of an exemplary embodiment of the present invention, an apparatus for controlling power of a fixing unit is provided. The apparatus comprises a power supply unit and a power controller. The power supply unit supplies DC power to the fixing unit and the power controller controls the power supply unit to gradually increase a DC power supply time until a pre-set time is reached.

The power supply unit may comprise a power converter and a DC power supply unit. The power converter converts alternate current (AC) power to DC power and the DC power supply unit supplies the converted DC power to the fixing unit.

The power controller may control the power supply unit to gradually increase an AC power supply time.

The power controller may measure a frequency of the AC power and control the AC power supply time based on the measured frequency.

The power controller may comprise a frequency measurement unit, a table storage unit, a time determinator and a supply time controller. The frequency measurement unit measures a frequency of the AC power. The table storage unit stores a table for controlling an AC power supply time corresponding to a frequency of the AC power. The time determinator determines an AC power supply time corresponding to the measured frequency from the table storage unit and the supply time controller controls the power supply unit in response to the determined AC power supply time.

The power controller may measure a zero crossing time of the AC power and control the power supply unit in response to the measured zero crossing time.

The power controller may comprise an AC power measurement unit, a table storage unit, a time determinator and a supply time controller. The AC power measurement unit measures a zero crossing time of the AC power and the table storage unit stores a table for controlling an AC power supply time corresponding to a zero crossing time of the AC power. The time determinator determines an AC power supply time corresponding to the measured zero crossing time from the table storage unit and the supply time controller controls the power supply unit in response to the determined AC power supply time.

The power controller may control the power supply unit to supply the maximum power until a temperature of the fixing unit reaches a threshold temperature after the pre-set time passes.

According to another aspect of an exemplary embodiment of the present invention, a method of controlling power of a fixing unit is provided. DC power is received and a supply time of the DC power to the fixing unit is controlled to be gradually increased until a pre-set time is reached.

AC power is converted to DC power and the converted DC power is received.

An AC power supply time may be controlled to be gradually increased.

While a supply time of the DC power to the fixing unit is controlled, a frequency of the AC power may be measured, and the AC power supply time may be controlled based on the measured frequency.

During the controlling, a frequency of the AC power may be measured, an AC power supply time corresponding to the measured frequency may be determined from a table for controlling an AC power supply time corresponding to a frequency of the AC power and the AC power may be controlled in response to the determined AC power supply time.

In the controlling, a zero crossing time of the AC power may be measured, and the AC power supply time may be controlled in response to the measured zero crossing time.

During the controlling, a zero crossing time of the AC power may be measured, an AC power supply time corresponding to the measured zero crossing time may be determined from a table for controlling an AC power supply time corresponding to a zero crossing time of the AC power and the AC power may be controlled in response to the determined AC power supply time.

In the controlling, the maximum power may be controlled to be supplied until a temperature of the fixing unit reaches a threshold temperature after the pre-set time passes.

According to another aspect of an exemplary embodiment of the present invention, a computer readable recording medium is provided to store a computer readable program for executing the method described above.

Other objects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other exemplary objects, features and advantages of certain exemplary embodiments of the present invention will be more apparent from the following description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
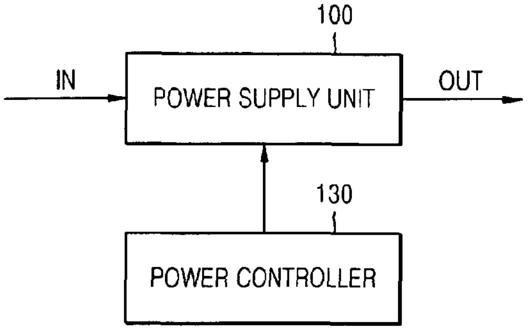
FIG. 1 is a block diagram of an apparatus for controlling power of a fixing unit according to an exemplary embodiment of the present invention.

FIG. 1 is a block diagram of an apparatus for controlling power of a fixing unit according to an exemplary embodiment of the present invention. Referring to FIG. 1, the apparatus includes a power supply unit 100 and a power controller 130.

The power supply unit 100 receives DC power, such as battery power, or AC power through an input terminal IN and supplies DC power to the fixing unit through an output terminal OUT. The supplied DC power is supplied to a heating member, such as a resistor. The resistor generates heat to fix a developer, such as toner, onto a print medium in the fixing unit.

Figure 10A:
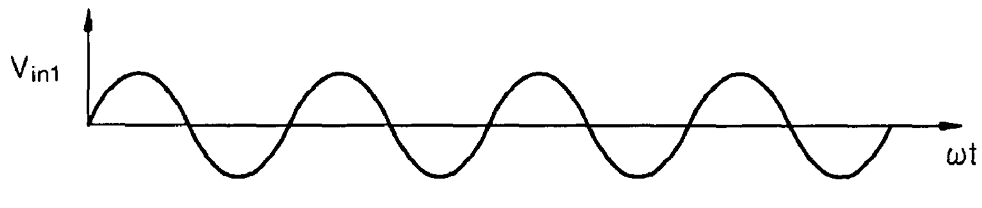
FIGS. 10A through 10C and 11 are diagrams explaining an apparatus and method for controlling power of a fixing unit according to an exemplary embodiment of the present invention.
Figure 10B:
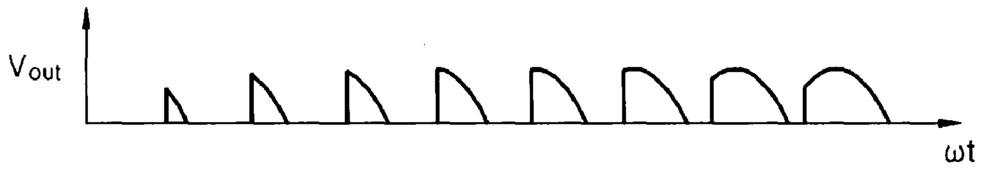
Figure 10C:
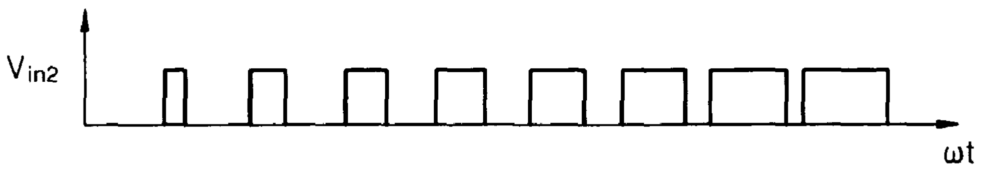
Figure 11:
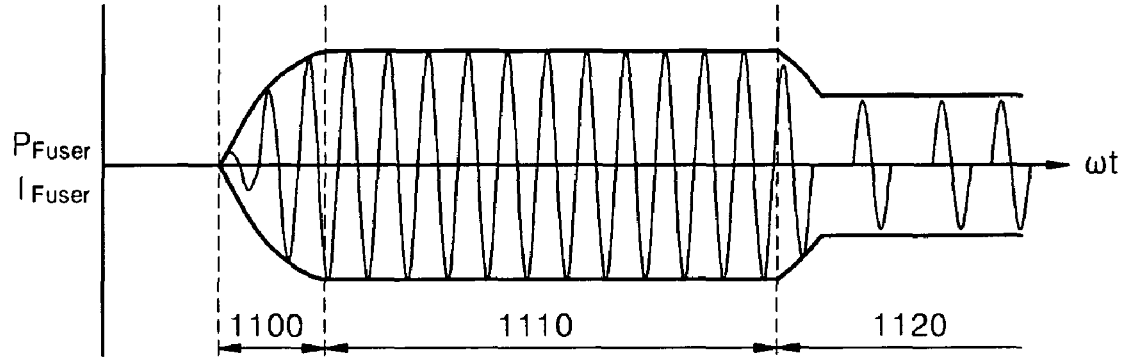

The power controller 130 controls the power supply unit 100 to gradually increase a supply time of the DC power to the fixing unit until a pre-set time is reached, as illustrated in FIGS. 10B and 10C. This facilitates the gradual increase of a power or current supplied to the fixing unit as in a phase control period 1100 illustrated in FIG. 11, thereby decreasing a flicker characteristic. FIG. 11 also illustrates a succession print control period 1120.

Figure 2:
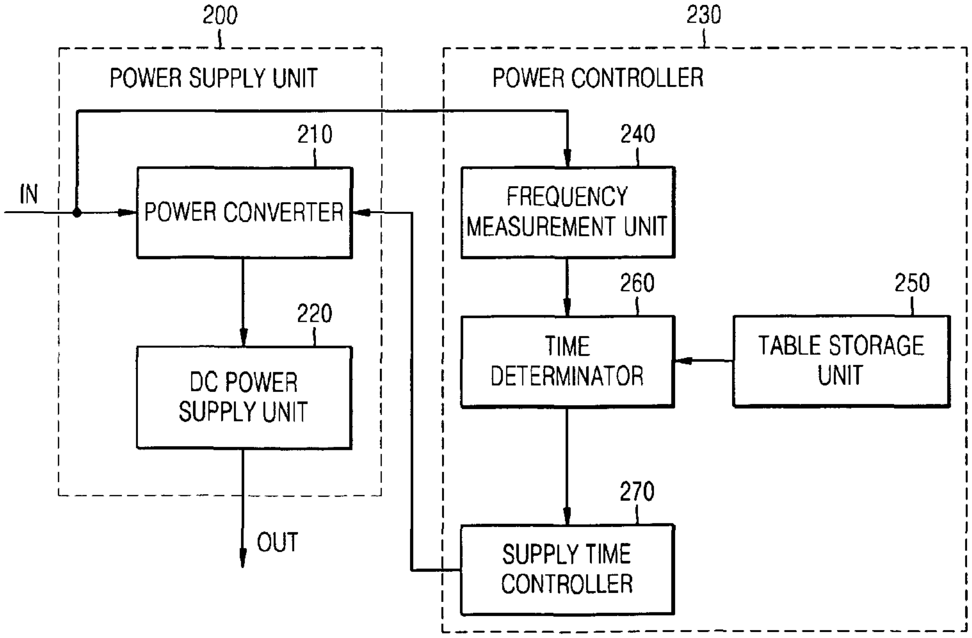
FIG. 2 is a block diagram of an apparatus for controlling power of a fixing unit according to another exemplary embodiment of the present invention.

FIG. 2 is a block diagram of an apparatus for controlling power of a fixing unit according to another exemplary embodiment of the present invention. Referring to FIG. 2, the apparatus includes a power supply unit 200 and a power controller 230.

The power supply unit 200 receives AC power illustrated in FIG. 10A through an input terminal IN, converts the AC power to DC power, and supplies the converted DC power to the fixing unit through an output terminal OUT. The supplied DC power is supplied to a heating member, such as a resistor. The heating member generates heat to fix a developer, such as toner, onto a print medium in the fixing unit.

The power supply unit 200 includes a power converter 210 and a DC power supply unit 220.

Figure 4:
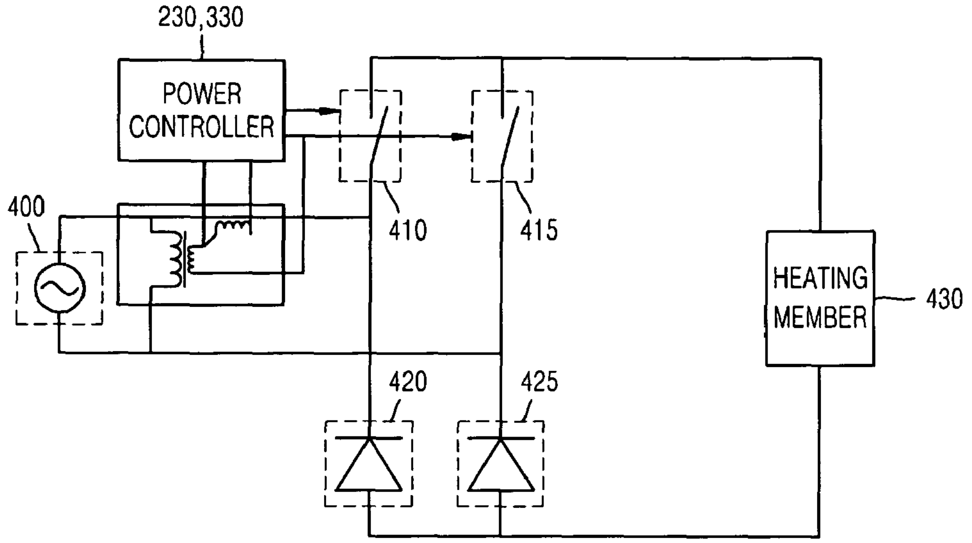
FIG. 4 is a circuit diagram of an apparatus for controlling power of a fixing unit according to an exemplary embodiment of the present invention.
Figure 5:
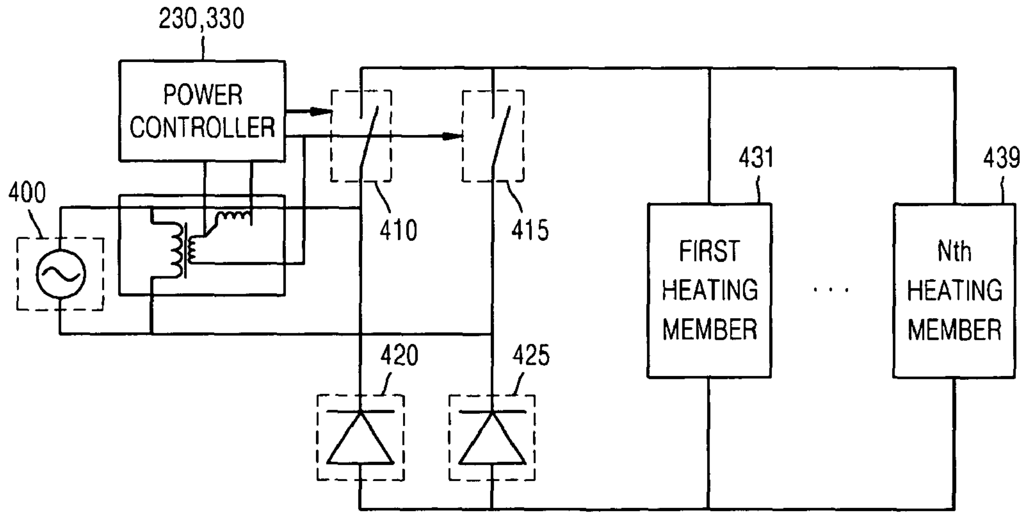
FIG. 5 is a circuit diagram of an apparatus for controlling power of a fixing unit according to another exemplary embodiment of the present invention.

A supply time controller 270 controls the power converter 210 to convert the received AC power to the DC power. As illustrated in FIGS. 4 and 5, the power converter 210 supplies the DC power to a heating member 430 included in the fixing unit. The DC power is converted from the AC power supplied from an AC power supply unit 400 by switching a first switch 410 and a second switch 415 in response to a control signal from the power controller 230 using a full-wave rectifier comprising a first diode 420 and a second diode 425. The heating member included in the fixing unit may be realized using the single heating member 430 illustrated in FIG. 4 or using I through N heating members 431 through 439 illustrated in FIG. 5.

The DC power supply unit 220 supplies the DC power converted by the power converter 210 to the fixing unit through the output terminal OUT.

The power controller 230 controls the power supply unit 200 to gradually increase a supply time of the AC power input to the power supply unit 200 through the input terminal IN in the phase control period 1100. Thus an inrush current can be reduced by the power controller 230.

Since a positive temperature coefficient (PTC) characteristic, such as, a resistance determined in proportion to, or inversely proportional to, a temperature of a resistor, decreases in a maximum power control period 1110 after the phase control period 1100, the power controller 230 controls the power supply unit 200 to supply the maximum power until a temperature of the fixing unit reaches a threshold temperature. This facilitates the supply of the maximum power to the fixing unit and thereby, the reduction of the time taken for heating a fixing roller in order to fix a developer onto a print medium.

When a printing job is performed after the temperature of the fixing unit reaches the threshold temperature, the power controller 230 controls an average power supplied to the fixing unit by controlling a frequency according to the temperature of the fixing unit. The frequency control is performed by controlling an ON/OFF sequence to minimize the flicker characteristic.

The power controller 230 includes a frequency measurement unit 240, a table storage unit 250, a time determinator 260, and the supply time controller 270.

The frequency measurement unit 240 initially measures a frequency of the AC power supplied to the power supply unit 200.

The table storage unit 250 stores a table for controlling an AC power supply time corresponding to the frequency of the AC power.

The time determinator 260 determines an AC power supply time corresponding to the frequency measured by the frequency measurement unit 240 from the table storage unit 250.

The supply time controller 270 controls a supply time of the AC power input to the power converter 210 in response to the AC power supply time determined by the time determinator 260.

Figure 3:
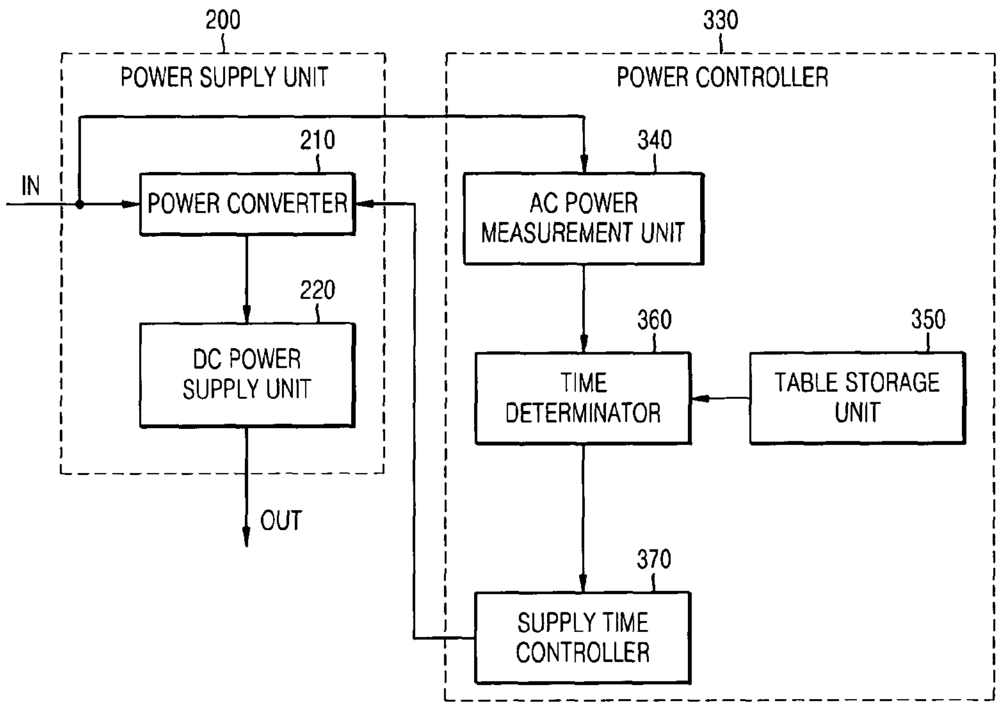
FIG. 3 is a block diagram of an apparatus for controlling power of a fixing unit according to yet another exemplary embodiment of the present invention.

FIG. 3 is a block diagram of an apparatus for controlling power of a fixing unit according to another exemplary embodiment of the present invention. Referring to FIG. 3, the apparatus includes the power supply unit 200 and a power controller 330.

The power supply unit 200 receives AC power illustrated in FIG. 10A through the input terminal IN, converts the AC power to DC power, and supplies the converted DC power to the fixing unit through the output terminal OUT. The supplied DC power is supplied to a heating member, such as a resistor. The heating member generates heat to fix a developer, such as toner, onto a print medium in the fixing unit.

The power supply unit 200 includes the power converter 210 and the DC power supply unit 220.

A supply time controller 370 controls the power converter 210 to convert the received AC power to the DC power. As illustrated in FIGS. 4 and 5, the power converter 210 supplies the DC power to the heating member 430 included in the fixing unit. The DC power is converted from the AC power supplied from the AC power supply unit 400 by switching the first switch 410 and the second switch 415 in response to a control signal from the power controller 330 using the full-wave rectifier comprising the first diode 420 and the second diode 425. The heating member included in the fixing unit may be realized using the single heating member 430 illustrated in FIG. 4 or using the 1 through N heating members 431 through 439 illustrated in FIG. 5.

The DC power supply unit 220 supplies the DC power converted by the power converter 210 to the fixing unit through the output terminal OUT.

The power controller 330 controls the power supply unit 200 to gradually increase a supply time of the AC power input to the power supply unit 200 through the input terminal IN in the phase control period 1100. Thus an inrush current can be reduced by the power controller 330.

Since the PTC characteristic decreases in the maximum power control period 1110 after the phase control period 1100, the power controller 330 controls the power supply unit 200 to supply the maximum power until the temperature of the fixing unit reaches the threshold temperature. This facilitates the supply of the maximum power to the fixing unit, and thereby, a reduction of the time taken to heat the fixing roller in order to fix a developer onto a print medium.

When a printing job is performed after the temperature of the fixing unit reaches the threshold temperature, the power controller 330 controls an average power supplied to the fixing unit by controlling a frequency according to the temperature of the fixing unit. The frequency control is performed by controlling an ON/OFF sequence to minimize the flicker characteristic.

The power controller 330 includes an AC power measurement unit 340, a table storage unit 350, a time determinator 360 and the supply time controller 370.

The AC power measurement unit 340 initially measures a zero crossing time of the AC power supplied to the power supply unit 200.

The table storage unit 350 stores a table for controlling an AC power supply time corresponding to a zero crossing time of the AC power.

The time determinator 360 determines an AC power supply time corresponding to the zero crossing time measured by the AC power measurement unit 340 from the table storage unit 350.

The supply time controller 370 controls a supply time of the AC power input to the power converter 210 in response to the AC power supply time determined by the time determinator 360.

Figure 6:
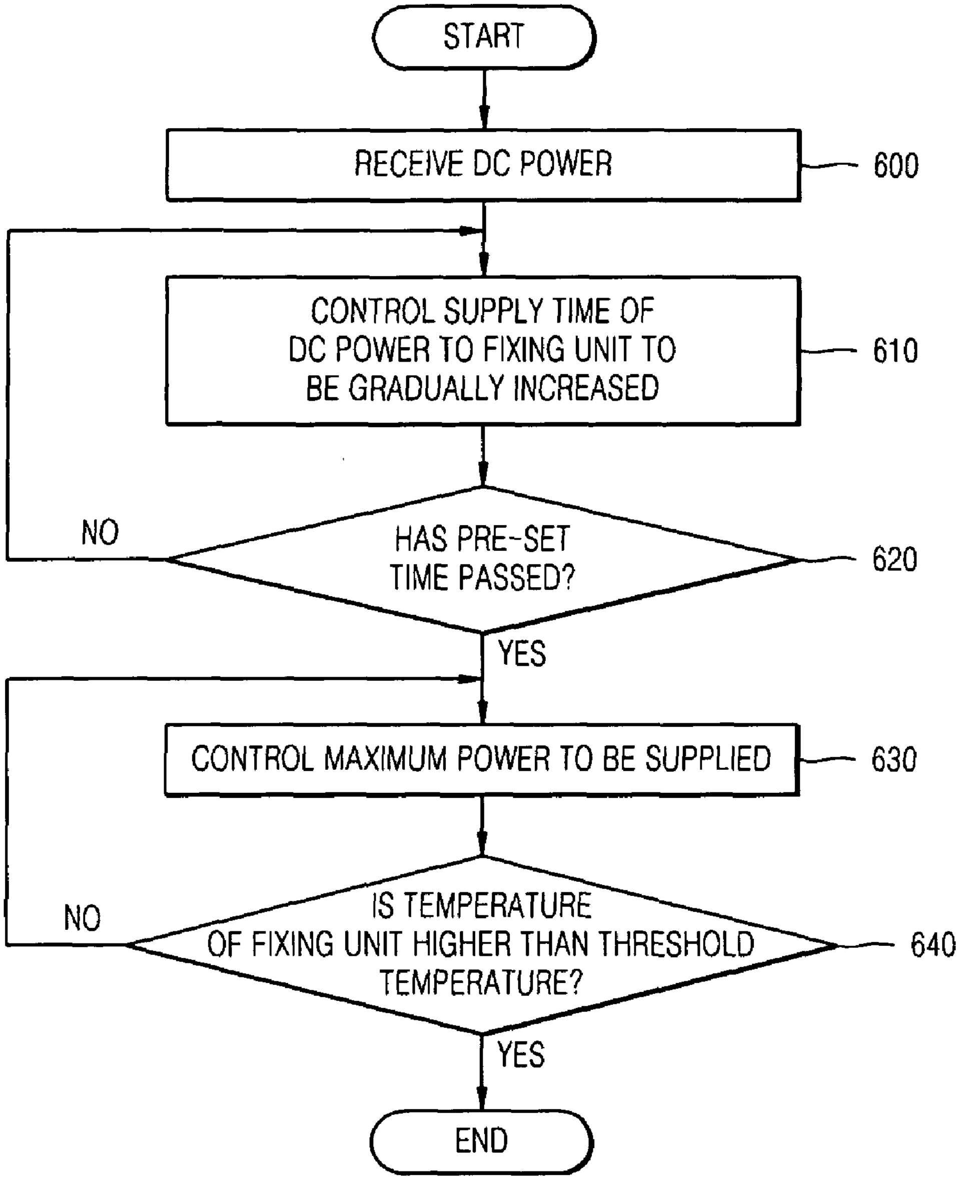
FIG. 6 is a flowchart illustrating a method of controlling power of a fixing unit according to an exemplary embodiment of the present invention.

FIG. 6 is a flowchart illustrating a method of controlling power of a fixing unit according to an exemplary embodiment of the present invention.

Referring to FIG. 6, in step 600, DC power to be supplied to the fixing unit is input.

In step 610, a supply time of the input DC power to the fixing unit is controlled to be gradually increased. Here, the input DC power is supplied to a heating member, such as a resistor. The heating member generates heat to fix a developer, such as toner, onto a print medium in the fixing unit.

In step 620, a determination is made as to whether a pre-set time has passed from the point at which power was supplied to the fixing unit.

If a determination is made that the pre-set time has not passed, the supply time of the input DC power to the fixing unit is controlled to be gradually increased in step 610.

If a determination is made that the pre-set time has passed, the maximum power is controlled to be supplied to the fixing unit, in step 630.

In step 640, a temperature of the fixing unit is compared to a threshold temperature.

If the temperature of the fixing unit is not higher than the threshold temperature, the maximum power is controlled to be supplied to the fixing unit in step 630.

Figure 7:
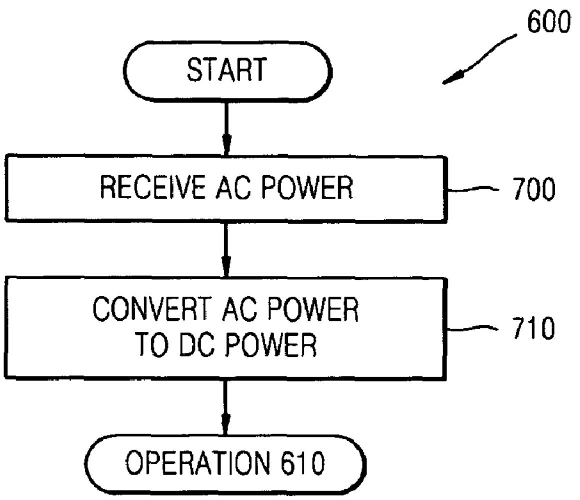
FIG. 7 is a flowchart illustrating an operation of FIG. 6 in which power to be received by the fixing unit is input, according to an exemplary embodiment of the present invention.

FIG. 7 is a flowchart illustrating step 600 of FIG. 6, according to an exemplary embodiment of the present invention.

Referring to FIG. 7, in step 700, AC power is input.

In step 710, the input AC power is converted to DC power.

The DC power may be directly input from a power source, such as a battery, as in step 600 illustrated in FIG. 6 or may be input by receiving AC power and converting the AC power to the DC power as illustrated in FIG. 7.

Figure 8:
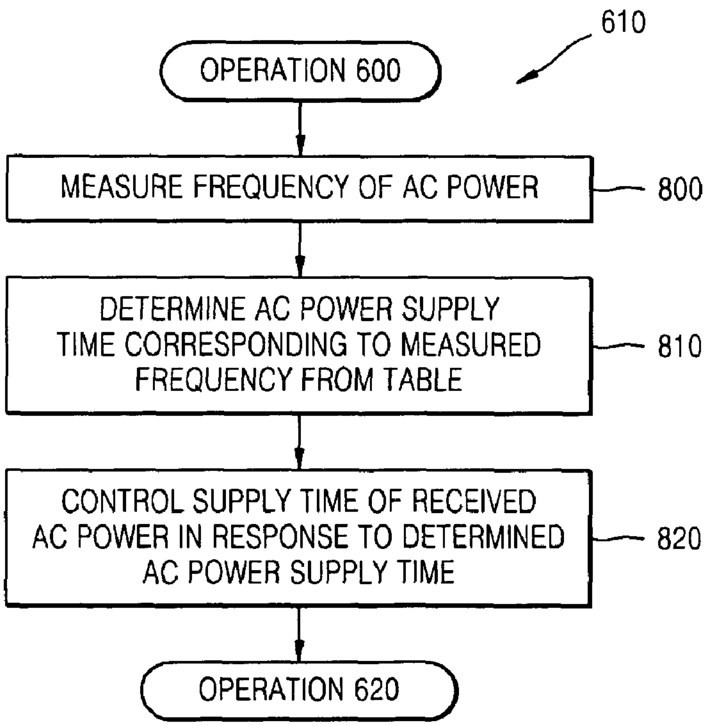
FIG. 8 is a flowchart illustrating an operation of FIG. 6 where a supply time of the input power to the fixing unit is gradually increased, according to an exemplary embodiment of the present invention.

FIG. 8 is a flowchart illustrating step 610 of FIG. 6, according to an exemplary embodiment of the present invention.

Referring to FIG. 8, in step 800, a frequency of the AC power input in step 700 is initially measured.

In step 810, an AC power supply time corresponding to the frequency measured in step 800 is determined from a table for controlling an AC power supply time corresponding to a frequency of the AC power.

In step 820, a supply time of the AC power input in step 700 is controlled in response to the AC power supply time determined in step 810.

Figure 9:
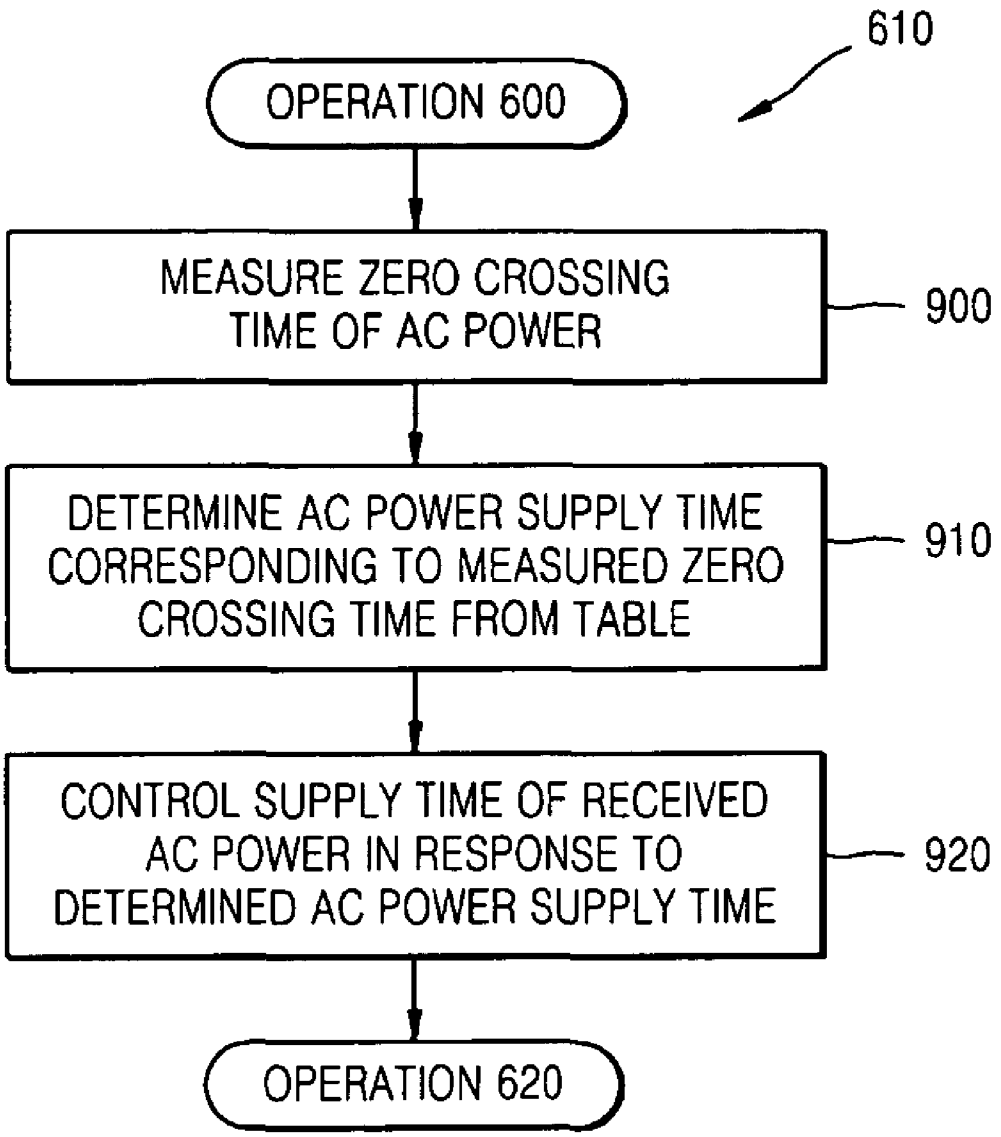
FIG. 9 is a flowchart illustrating an operation of FIG. 6 in which a supply time of the input power to the fixing unit is gradually increased, according to another exemplary embodiment of the present invention.

FIG. 9 is a flowchart illustrating step 610 of FIG. 6, according to another exemplary embodiment of the present invention.

Referring to FIG. 9, in step 900, a zero crossing time of the AC power input in step 700 is initially measured.

In step 910, an AC power supply time corresponding to the zero crossing time measured in step 900 is determined from a table for controlling an AC power supply time corresponding to a zero crossing time of the AC power.

In step 920, a supply time of the AC power input in step 700 is controlled in response to the AC power supply time determined in step 910.

The present invention can also be embodied as computer readable codes on a computer readable recording medium. The computer readable recording medium is any data storage device that can store programs or data which can be thereafter read by a computer system. Examples of the computer readable recording medium include read-only memory (ROM), random-access memory (RAM), CD-ROMs, magnetic tapes, hard disks, floppy disks, flash memory, and optical data storage devices, among others. It may also be envisioned that a medium distributed over network-coupled computer systems may function as an equivalent to a computer readable medium. Also, functional programs, codes and code segments for accomplishing the present invention can be easily construed as within the scope of the invention by programmers skilled in the art to which the present invention pertains.

As described above, in an apparatus and method for controlling power of a fixing unit according to the exemplary embodiment of the present invention, a flicker characteristic can be improved by gradually increasing a supply time of DC power to the fixing unit.

This facilitates a user's efficient use of a printing device by reducing a print waiting time. In addition, by using DC power, a complementary DC power source, such as a battery, can be used in parallel, and a protector against abnormal conditions, such as surge, can be reliably designed.

While the present invention has been shown and described with reference to certain exemplary embodiments thereof, it will be understood by those of ordinary skill in the art that various changes in form and detail may be made therein without departing from the spirit and scope of the invention as defined by the appended claims and their equivalents.

What is claimed is:

1. An apparatus for controlling power of a fixing unit, the apparatus comprising:

a power supply unit to supply direct current (DC) power to the fixing unit for heating the fixing unit to reach or maintain a threshold temperature to fix a developer onto a print medium; and a power controller to control the power supply unit to gradually increase a DC power supply time until a pre-set time is reached and supply the maximum power until a temperature of the fixing unit reaches the threshold temperature after the pre-set time has passed.

2. The apparatus of claim 1, wherein the power supply unit comprises:

a power converter for converting alternate current (AC) power to DC power; and a DC power supply unit for supplying the converted DC power to the fixing unit.

3. The apparatus of claim 2, wherein the power controller controls the power supply unit to gradually increase an AC power supply time.

4. The apparatus of claim 3, wherein the power controller measures a frequency of the AC power and controls the AC power supply time based on the measured frequency.

5. The apparatus of claim 4, wherein the power controller comprises:

a frequency measurement unit for measuring a frequency of the AC power;

a table storage unit for storing a table for controlling an AC power supply time corresponding to a frequency of the AC power;

a time determinator for determining an AC power supply time corresponding to the measured frequency based on the table stored in the table storage unit; and a supply time controller for controlling the power supply unit in response to the determined AC power supply time.

6. The apparatus of claim 5, wherein the power controller comprises:

an AC power measurement unit for measuring a zero crossing time of the AC power;

a table storage unit for storing a table for controlling an AC power supply time corresponding to a zero crossing time of the AC power;

a time determinator for determining an AC power supply time corresponding to the measured zero crossing time based on the table stored in the table storage unit; and a supply time controller for controlling the power supply unit in response to the determined AC power supply time.

7. The apparatus of claim 3, wherein the power controller measures a zero crossing time of the AC power and controls the power supply unit in response to the measured zero crossing time.

8. A method of controlling power of a fixing unit, the method comprising the steps of:

receiving DC power for heating the fixing unit to reach or maintain a threshold temperature to fix a developer onto a print medium; and controlling a supply time of the DC power to the fixing unit to be gradually increased until a pre-set time is reached and supply the maximum power until a temperature of the fixing unit reaches the threshold temperature after the pre-set time has passed.

9. The method of claim 8, wherein the receiving comprises:

converting AC power to DC power; and receiving the DC power converted from the AC power.

10. The method of claim 9, wherein in the controlling, an AC power supply time is controlled to be gradually increased.

11. The method of claim 10, wherein in the controlling, a frequency of the AC power is measured, and the AC power supply time is controlled based on the measured frequency.

12. The method of claim 11, wherein the controlling comprises:

determining an AC power supply time corresponding to the measured frequency from a table for controlling an AC power supply time corresponding to a frequency of the AC power; and controlling the AC power in response to the determined AC power supply time.

13. The method of claim 11, wherein in the controlling, a zero crossing time of the AC power is measured, and the AC power supply time is controlled according to the measured zero crossing time.

14. The method of claim 13, wherein the controlling comprises:

measuring a zero crossing time of the AC power;

determining an AC power supply time corresponding to the measured zero crossing time from a table for controlling an AC power supply time corresponding to a zero crossing time of the AC power; and controlling the AC power according to the determined AC power supply time.

15. A non-transitory computer readable recording medium having embodied thereon a computer readable program for executing a method of controlling power of a fixing unit, the method comprising the steps of:

receiving DC power for heating the fixing unit to reach or maintain a threshold temperature to fix a developer onto a print medium; and controlling a supply time of the DC power to the fixing unit to be gradually increased until a pre-set time is reached;

wherein in the controlling, the maximum power is controlled to be supplied until a temperature of the fixing unit reaches the threshold temperature after the pre-set time has passed.

16. The computer readable recording medium of claim 15, wherein the receiving comprises:

converting AC power to DC power; and receiving the DC power converted from the AC power.

17. The computer readable recording medium of claim 16, wherein an AC power supply time is controlled to be gradually increased in the controlling.

18. The computer readable recording medium of claim 17, wherein in the controlling, a frequency of the AC power is measured, and the AC power supply time is controlled based on the measured frequency.

19. The computer readable recording medium of claim 18, wherein the controlling comprises:

determining an AC power supply time corresponding to the measured frequency from a table for controlling an AC power supply time corresponding to a frequency of the AC power; and controlling the AC power according to the determined AC power supply time.

20. The computer readable recording medium of claim 18, wherein in the controlling, a zero crossing time of the AC power is measured, and the AC power supply time is controlled according to the measured zero crossing time.

21. The computer readable recording medium of claim 20, wherein the controlling comprises:

measuring a zero crossing time of the AC power;

determining an AC power supply time corresponding to the measured zero crossing time from a table for controlling an AC power supply time corresponding to a zero crossing time of the AC power; and controlling the AC power according to the determined AC power supply time.

* * * * *